United States Patent Office 3,446,151
Patented May 27, 1969

3,446,151
SUBMERSIBLE CENTRIFUGAL PUMP
Hilding Gustav Vincent Andersson, Liatorp, Sweden, assignor to Osby Pumpindustri, Osby, Sweden
Filed June 8, 1967, Ser. No. 644,705
Int. Cl. F04d 7/00, 3/02
U.S. Cl. 103—111                 2 Claims

ABSTRACT OF THE DISCLOSURE

A submersible centrifugal pump having cutting means for comminuting straw and other fiber material suspended in the pumped medium, in which the cutting means releases uncomminuted fiber material and prevents clogging of the pump.

---

This invention relates to a centrifugal pump for manure suspended in water and containing a substantial proportion of straw and other fiber material. Pumps of this type are used both for agitating the manure in a collecting space and for pumping the manure from said collecting space to a tank arranged on a vehicle for spreading the manure on the field. Such pumps comprise stationary cutting means defining an intake opening of the pump and rotatable cutting means which during operation of the pump comminute the straw and other fiber material, thereby permitting pumping and spreading of the manure.

The straw and other fiber material is mostly tough and is not at all or only partly cut when subjected to the action of the cutting means and therefore said material is collected and carred along in uncut state by the rotating cutting means, finally resulting in the pump being clogged.

The submersible centrifugal pump according to the present invention eliminates clogging by the action of straw and other fiber material and provides an unrestricted flow of the medium through the pump in that the stationary cutting means comprise a ring having a cutting edge projecting into said intake opening to a point in the vicinity of the axis of the rotary cutting means, and a release edge attached to said cutting edge at said point and extending substantially radially in said ring.

These features of the invention and the advantages gained thereby will become aparent from the following description in which reference is made to the accompanying drawing.

Figure 1:
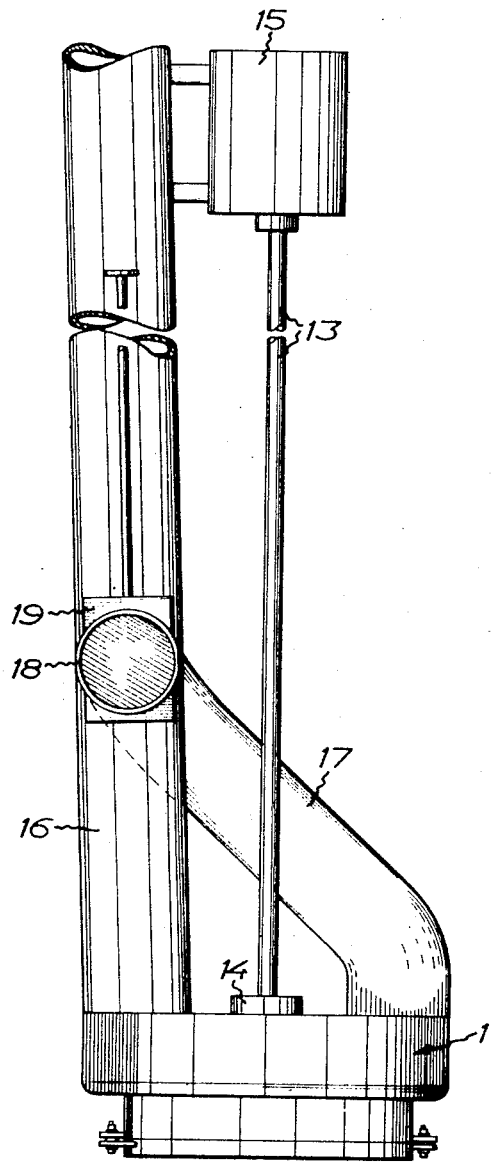
Figure 2:
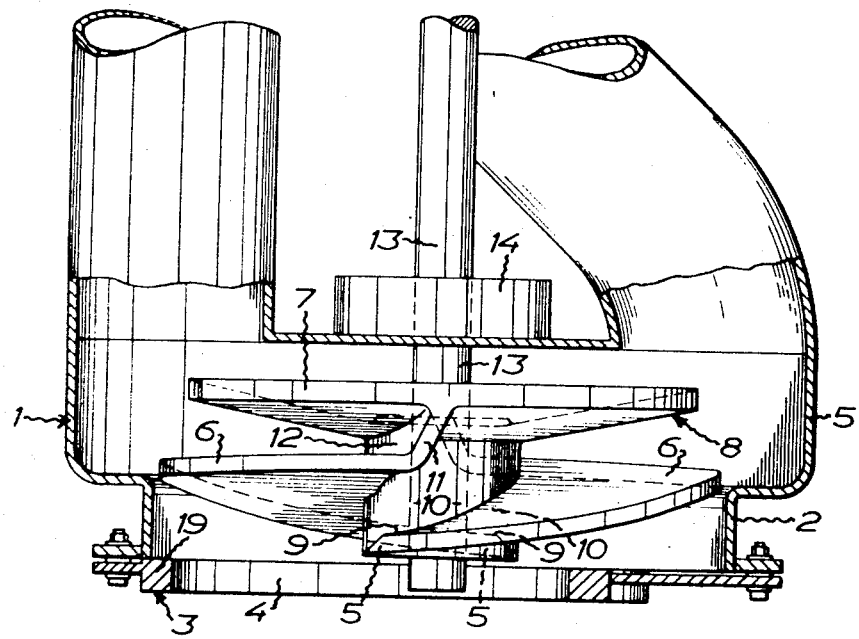
Figure 3:
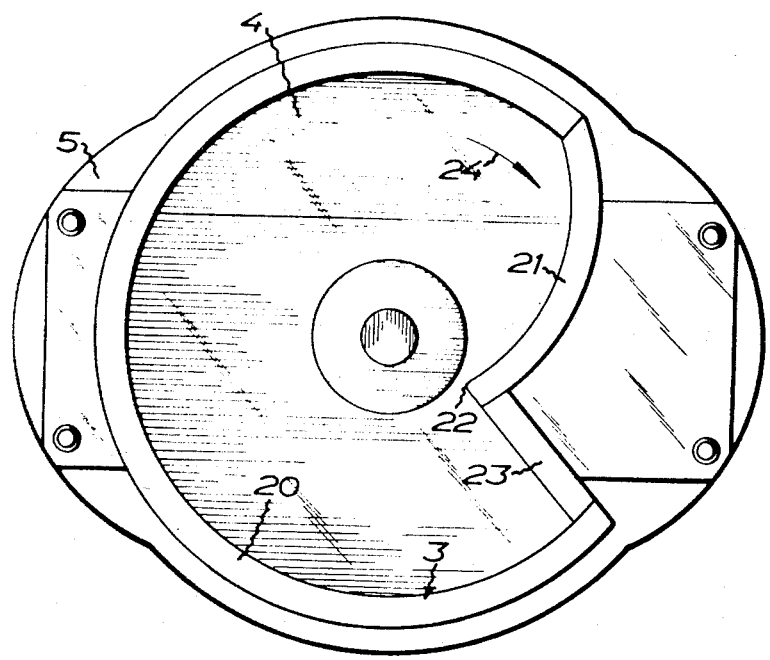

In the drawing:
FIGURE 1 is a side elevation of the submersible centrifugal pump;
FIGURE 2 is a view partly in section and on a larger scale of the lower part of the pump;
FIGURE 3 is a view of the pump as seen from below.

The submersible centrifugal pump consists of a pump housing 1. The lower part 2 of the pump housing 1 is circular. Inserted in said lower part 2 is a stationary cutting means 3 defining an intake opening 4 of the pump. The upper part 5 of the housing 1 is shown to have oval configuration. Mounted in the upper part 5 of the housing 1 are peripherally spaced cutting blades each formed as part of a screw thread, and a disk 7. Said peripherally spaced cutting blades and said disk 7 defne an impeller 8. The disk 7 is cup-shaped. The cutting blades 6 have approximately opposed ends situated axially of the pump and one of said ends constitutes a cutting edge 9 defining two openings 10. A wall 11 extends from the other of said ends and connects onto the underside of said cup-shaped disk 7. The impeller 8 has a hub 12 by which it is mounted on a shaft 13 disposed in a bearing 14 in the housing 1 and connected with a motor 15 adapted to drive the impeller 8.

Two pipes, a primary pipe 16 and a secondary pipe 17, are connected to the upper oval part 5 of the pump housing 1. The primary pipe 16 are straight while the secondary pipe 17 is bent and connected to the primary pipe 16 a short distance above the pump housing 1. Adjacent the point of connection of the secondary pipe 17 to the primary pipe 16 there is arranged an extension pipe 18 equipped with a shutter 19 for closing the pipe.

The stationary cutting means 3 in the lower part of the housing is comprised of a ring 20. This ring 20 has a cutting edge 21 projecting into the intake opening 4 to a point 22 in the vicinity of the shaft 13 defining the axis of the impeller 8. From that end point 22 of the cutting edge 21 which is closest to the shaft 13 a release edge 23 extends substantially radially in said ring 20. In the embodiment illustrated the cutting edge 21 is arcuate in its longitudinal direction, the concave side of the arc facing the direction of rotation of the cutting blades as shown by the arrow 24 in FIGURE 2.

Agitation of the surrounding composition is effected prior to initation of the pumping of the composition. The agitation is brought about by opening the shutter 19 whereby the liquid flow passes directly into the surrounding composition. During pumping the composition is sucked through the intake opening 4 with the aid of the impeller 8. Straw or like material is cut by the leading cutting edges 9 of the blades effecting a cutting action against the cutting edge 21 of the ring 20. This will provide a very efficient cutting operation and no material will collect or be twisted together. Should the material not be cut to pieces by the cooperating cutting means 9, 21 but be carried along in an uncut state by the impeller 8, the material will be released from the cutting edge of the blades 8 when the latter go past point 22 whereafter the material will be carried along by the lquid flowing through the housing 1.

What I claim and desire to secure by Letters Patent is:

1. A submersible centrifugal pump for manure or other matter suspended in water, comprising a housing, rotatable cutting blades forming an impeller in said housing, outlet pipes at the upper side of said housing and stationary cutting means cooperating with said rotatable cutting blades and defining an intake opening at the lower part of said housing, said stationary cutting means comprising a ring, said ring having a cutting edge projecting into said intake opening to a point in the vicinity of the axis of said impeller, and a release edge attached to said cutting edge at said point and extending substantially radially in said ring.

2. A submersible centrifugal pump for manure or other matter suspended in water, comprising a housing, rotatable cutting blades forming an impeller in said housing, outlet pipes at the upper side of said housing and stationary cutting means cooperating with rotatable cutting blades and defining an intake opening at the lower part of said housing, said stationary cutting means comprising a ring, said ring having a cutting edge projecting into said intake opening to a point in the vicinity of the axis of said impeller, said cutting edge being curved in longitudinal direction with the concavity directed toward the rotary motion of said cutting blades, and a release edge attached to said cutting edge at said point and extending substantially radially in said ring.

References Cited

UNITED STATES PATENTS

| 773,483 | 10/1904 | Drew. | |
| 3,096,718 | 7/1963 | Anderson | 103—111.1 |
| 3,316,843 | 5/1967 | Vaughan. | |
| 3,340,812 | 9/1967 | Schlesiger | 103—111.1 |

OTHER REFERENCES 96,293  10/1922  Switzerland.

HENRY F. RADUAZO, *Primary Examiner.*

U.S. Cl. X.R.

103—2, 103